United States Patent [19]

Harris, Jr.

[11] Patent Number: 4,969,131

[45] Date of Patent: Nov. 6, 1990

[54] AUTOMATIC DETECTION AND CLASSIFICATION EQUIPMENT FOR HIGH RESOLUTION SONAR

[75] Inventor: William G. Harris, Jr., Titusville, Fla.

[73] Assignee: The United States of America as represented by the Secretary of the Navy, Washington, D.C.

[21] Appl. No.: 844,726

[22] Filed: Jul. 9, 1969

[51] Int. Cl.$^5$ ............................................... G01S 15/00
[52] U.S. Cl. ..................................... 367/116; 367/107; 367/99
[58] Field of Search ...................... 340/3, 3 R; 367/99, 367/107, 116

[56] References Cited

U.S. PATENT DOCUMENTS 3,478,308 11/1969 Stanley et al. .......................... 367/98

Primary Examiner—Thomas H. Tarcza
Assistant Examiner—Daniel T. Pihulic
Attorney, Agent, or Firm—Harvey David; John Becker; Sol Sheinbein

[57] ABSTRACT

The echo ranging system of the invention comprises circuit means to differentiate between shadows cast by objects and the period of time prior to the receipt of the first bottom return, as well as the lack of bottom reverberation for other reasons. Additional circuit means determines if the length of the shadow signals in comparison to their range exceeds a predetermined value. Circuit means are also included to produce a first electrical signal when such shadow signals are received. Further circuitry analyzes the shadow signals for which the first electrical signals were provided and produces a second electrical signal when said object shadow signals exceed in number or length a predetermined value. Additional circuit means are provided to convert said first and second electrical signals to suitable audible signals which may be readily distinguished, one from the other.

11 Claims, No Drawings

AUTOMATIC DETECTION AND CLASSIFICATION EQUIPMENT FOR HIGH RESOLUTION SONAR

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

A type of sonar system having particular advantages in modern minehunting and salvage operations is commonly termed the shadowgraph type. In this type sonar system, the sonar is constructed such that the echo producing acostic energy is beamed at a low angle relative to the bottom. This grazing incidence of the ensonifying energy striking an object standing proud of the bottom produces a characteristic shadow which, by virtue of its shape, greatly assists in identifying the object struck by the ensonifying sound beam. Irregularities on the bottom, marine life, and small objects produce a multitude of small shadows and highlights on the indicator scope of such systems. These irregularities, termed clutter, make monitoring the indicator scope for a desired target a fatigueing duty.

On a relatively small ship, such as a minesweeper or salvage vessel, long or frequent watches are necessitated by limited crew complement. The fatigue introduced by long hours of close attention to a clutter-filled indicator scope increases the likelihood that operating personnel will make errors of identification.

If an operator could be freed from focusing his undivided attention on his indicator scope and could be alerted when the indicator scope has a target displayed thereon, the length of the watches could be increased without sacrificing accuracy. The resulting saving of personnel and the increased accuracy afforded by such a system would be a significant advance in the echo ranging arts.

A system having an audio indication denoting when signals of the predetermined desired type are received is a desirable solution to the deficiencies inherent in the prior operational arrangements. Prior attempts to produce such alarms have not been successful because of inabilities to differentiate between random signals attributable to marine life and other operational phenomena and the predetermined signals. Too, prior art attempts have had a limited flexibility and have been unable to cope with varying operational circumstances such as bottom debris and litter.

SUMMARY OF THE INVENTION

This invention pertains to an improved echo detection and ranging system.

In particular, this invention pertains to an automatic target signal classification and alarm arrangement for echo detection and ranging systems. The device of the invention is applicable to a variety of echo ranging devices, but, for purposes of explanation, it shall be described herein as it pertains to a high resolution sonar system.

In particular, the invention provides for an improved object detection and ranging system having target classification circuitry which, without attention from the operator, produces an audio signal if the shadow of an acquired target is of a predetermined length relative to its range. The system also has circuitry to produce a first audio signal for each highlight signal acquired and a second audio signal when the target classification circuitry produces a signal indicating the acquired target is larger than a predetermined size as indicated by the length of the shadow relative to its range.

Accordingly, it is an object of the present invention to provide an improved echo ranging system.

A further object of the invention is the provision of an improved signal analyzer for an echo ranging system.

A further object of the invention is the provision of an alarm system to indicate the presence of a predetermined echo return signal in a sonar system.

A further object of the invention is the provision of an alarm which is responsive to object highlight signals followed by shadow signals of a predetermined size in the video output of an echo ranging system.

An additional object of this invention is the provision of an audible alarm system to accompany a sonar display which will produce a first audio signal for a first predetermined type of signal return and a second audio signal upon the receipt of a further predetermined signal among said ones of said first predetermined type.

A further object of this invention is the provision of an audio alarm in an echo ranging system effective to accompany a visual display of object highlights and shadow echo signals of a predetermined type.

A further object of the invention is the provision of an audible alarm to accompany the visual display of a highlight followed by a shadow in a shadowgraph type sonar system.

Other objects and many of the attendant advantages will be readily appreciated as the subject invention becomes better understood by reference to the following detailed description, when considered in conjunction with the accompanying drawings.

BRIEF DESCRIPTION OF THE DRAWINGS

FIG. 1 is a diagrammatic showing of the system of the invention; and

FIGS. 2 and 3 are showings of various waveforms associated with particular circuit components of the invention.

DESCRIPTION OF THE PREFERRED EMBODIMENT

Referring to FIG. 1, an electroacoustic transducer 11 ensonifies an area in response to signals from a sonar transmitter 12. A sonar receiver 13, connected to transducer 11, provides a visual indication of echo signals returned to transducer 11 from objects struck by the ensonifying energy therefrom. Transducer 11 is shown as a single reversible unit, but may, if desired, be plural so as to separate the transmit or receive functions.

In addition to having a received signal input from transducer 11, receiver 13 is connected so as to receive a synchronizing signal from transmitter 12. The timing functions of receiver 13 necessary to the determination of the range of the echo producing target are initiated and synchronized by signals fed to receiver 13 from transmitter 12 in the well known manner.

The video signals from receiver 13 are fed to a highlight detector 14 and a shadow detector 15 by suitable signal transmission means connected therebetween. Highlight detector 14 is an envelope detector, sometimes referred to as a thresholder, of a conventional type. Shadow detector 15 comprises an envelope detector, together with a Schmitt trigger circuit, both of conventional state-of-the-art configurations.

The synchronizing signal output of sonar transmitter 12 is also routed to a monostable multivibrator 16 by suitable connections therebetween. The output of monostable multivibrator 16 is connected to the shadow detector 15, as well as to a sawtooth generator 17.

The highlight detector 14 is joined to a monostable multivibrator 18 and operatively configured to provide trigger impulses therefor. The output circuit of shadow detector 15 together with the output of monostable multivibrator 18 are connected to the input circuit of an "and" gate 19.

A trigger pulse is generated from the output signal of "and" gate 19 by a signal inverter 20 and a differentiating circuit 21 series connected thereto when the output signals of monostable multivibrator 18 and shadow detector 15 are present at "and" gate 19's input at the same time. The output terminal or circuit of differentiating circuit 21 is joined to the "flip" input of a bistable multivibrator 22. Another differentiating circuit 23 is connected so as to differentiate the output of shadow detector 15 and apply the differentiated signal to the "flop" input of bistable multivibrator 22.

Bistable multivibrator 22 is connected so as to apply its output to a controlled sawtooth generator 24. The output signal of controlled sawtooth generator 24 is a linearly increasing direct current pulsse which obtains a magnitude that is dependent on the length of time that bistable multivibrator 22 is in one of its conduction states. The output circuit of sawtooth generator 24 is coupled to the trigger input a Schmitt trigger circuit 25. Schmitt trigger circuit 25 also receives an input signal from sawtooth generator 17 which is connected so as to set a threshold triggering potential therefor.

When the output from the controlled sawtooth generator 24 exceeds the threshold potential of Schmitt trigger 25 as determined by the output of sawtooth generator 17, Schmitt trigger circuit 25 is triggered and the output thereof is fed to a time-to-voltage converter 26. Time-to-voltage converter 26 produces a D.C. voltage output that may be stored or integrated to approach the value of a supply voltage at a rate dependent on the duration and recurrence frequency of the individual pulse outputs of Schmitt trigger 25.

The output of Schmitt trigger circuit 25 is also joined to a differentiating circuit 27 which develops a triggering signal therefrom. Differentiating circuit 27 is connected such that the triggering signal is supplied to the input of a monostable multivibrator 28. The output of monostable multivibrator 28 is connected to an integrator 29 and is also connected to one input of an audio amplifier 31 to produce a click in a suitable electro-acoustic transducer, such as speaker 32, driven thereby.

The output circuit integrator 29 controls a discharge network 33 connected thereto which, as will be herein explained, includes a switching device, such as a transistor, gas or vacuum tube, relay, or other suitable device, used as a controlled discharge circuit for the time-to-voltage converter 26.

The time-to-voltage converter 26 is constructed so as to effectively trigger a Schitt trigger circuit 34 connected thereto. As indicated by the diagonal arrow, a Schmitt trigger circuit 34 is adjustable as to triggering potential. Schmitt trigger 34 is connected such the output thereof is differentiated by a differentiating circuit 35 joined thereto. Differentiating circuit 35 is joined by suitable signal transmission means to a monostable multivibrator 36. In turn, monostable multivibrator 36, which produces an output pulse of a convenient, predetermined duration, is effectively coupled to the keying input of an audio oscillator 37. Audio oscillator 37, which in response to the output pulse of monostable multivibrator 36 produces an output signal comprising a burst of audio frequency electrical energy, is joined by suitable signal transmission circuitry to the input of amplifier 31.

The output circuit of Schmitt trigger 34 is also joined by suitable signal conducting means to a second keying input of audio oscillator 37. This arrangement then permits audio oscillator to be keyed by Schmitt trigger 34 under certain circumstances to be discussed later in connection with the operation of the device.

The skilled artisan proficient in the design and construction of electronic equipment will recognize from the foregoing circuit description, taken together with the following description of the operation thereof, that the component arrangements comprising the various aforenamed circuit types are, per se, conventional arrangements. For that reason, the individual component arrangements comprising the individual circuits are not treated independently. However, for the purpose of completeness, it is noted that the circuits follow the general rules of good circuit design as outlined in standard treatises on the subject. One such work, Millman and Taub, *"Pulse, Digital, and Switching Waveforms,"* McGaw-Hill Book Co., New York 1965 (Library of Congress #64-66293) includes both the vacuum tube and solid state design parameters for all of the types circuits employed with the exception of sonar transmitter 12 and sonar receiver 13, both of which are conventional assemblies.

MODE OF OPERATION

The operation of the invention is best understood with reference to FIGS. 2 and 3 which illustrate the waveforms associated with the several units comprising the diagrammatic illustration of the device shown in FIG. 1. Each waveform is lettered to correspond with the lettered points on the appropriate signal flow arrows of FIG. 1. The waveforms are shortened in relative time duration for purposes of explanation. Each waveform has a duration of three ping-listen cycles of operation of the sonar system.

The initiating timing pulse for the entire sonar system are generated within sonar transmitter 12 and are generally referred to as synchronizing pulses and are represented at waveform A (FIG. 2) as negative spikes or pulses 38. The synchronizing pulses 38 are fed to sonar receiver 13 where they trigger the display sweep circuits in the well known manner. The synchronizing pulses 38, waveform A, are also fed to a monostable multivibrator 16 to provide triggering pulses therefor.

As shown by waveform B, monostable multivibrator 16 produces a single square wave pulse 39 for each synchronizing pulse 38. The duration of pulse 39, determined by adjustment of the circuit parameters of monostable multivibrator 16, is chosen so as to be shorter than the period of no signal return after transmission which is due to the height of the transducer 11 from the bottom. Square wave pulses 39 are fed to shadow detector 15 where they serve as blanking pulses. That is, they block any output therefrom for the duration of the pulse. Pulses 39 are also fed to sawtooth generator 17 where it serves as a reset-trigger pulse therefor.

The received signal output of sonar receiver 13 is shown at waveform C to be a conventional electrical signal analog of an echo return comprising a transmitted signal pulse 41 followed by a period of no signal corresponding to the travel time of the ensonifying pulse to the nearest reflecting body, generally the bottom. Following this period of no signal, a bottom reverberation signal 42 is received until the object echo pulse 43 is received. The period of no signal following object echo pulse 43 corresponds to the area of the bottom shaded by the object producing object echo pulse 43 and, accordingly, is termed object shadow signal 44. After object shadow signal 44, bottom reverberation signal 42 resumes. As previously mentioned, waveform C is shortened for purposes of illustration and, in actual operation, the individual cycles are longer in relation to the signal lengths than illustrated.

The output of sonar receiver 13, waveform C described above, is fed to shadow detector 15. Shadow detector 15 is a conventional circuit for use in shadowgraph type sonar systems and may be considered, for purposes of explanation, as an envelope detector combined with a Schmitt trigger. The circuit functions in an understood fashion so as to produce a voltage pulse output signal 45 during periods of no bottom reverberation signal 42 and during periods of object shadow signal 44. However, the circuit is held in a cutoff state by pulses 39 from monostable multivibrator 16 as previously noted. The resulting output from shadow detector 15, waveform D, is seen to comprise a plurality of square wave pulses 45 corresponding to the periods of shadow signal 44 and the final portion of the period of no signal return, at the beginning of each cycle of operation.

The output of sonar receiver 13, waveform C is also fed to highlight detector 14. This circuit is so named because it detects short duration pulses which, in the video presentation thereof, correspond to the brighter portions, or highlights, of the video display. Unfortunately, highlight detector 14 is also responsive to the transmitted pulses 41 and its output, waveform E, contains pulses 46 corresponding to the transmitted pulses 41 and object echo pulses 43.

The output of highlight detector 14 is fed to monostable multivibrator 18 to produce, in response thereto, a series of square wave pulses 47, as shown by waveform F.

The output from monostable multivibrator 18, waveform F, together with the output of shadow detector 15 are fed to "and" gate 19. The output of "and" gate 19 is shown at waveform G and comprises a series of coincidence pulses 48. Because the output of shadow detector 15 was blocked by square wave pulse 49 from monostable multivibrator 16, the square wave pulses 45 and 47 corresponding to the initial period of no signal and the transmitted pulse 41 are not in coincidence and there is no output from "and" circuit 19 during this interval. The square wave pulses 45 and 47 corresponding to the object shadow signal 44 and the object echo signal 43 are in coincidence and therefore, produce a coincidence pulse 48 marking the beginning of an object shadow signal 44.

The output of "and" gate 19 is inverted by signal inverter 20 and supplied to a differentiating circuit 21 which effectively differentiates the negative going edges of square wave pulses 48 to produce waveform H having spike pulses 49 corresponding to the leading edge of object shadow signal 44.

In a similar manner, the output of shadow detector 15, waveform D, is supplied to a differentiating circuit 23 to produce waveform J having a plurality of spike pulses 51 corresponding to the termination of the initial period of no signal return and the termination of object shadow signal 44.

The outputs of differentiating circuits 21 and 23, waveforms H and J respectively, are used to control the conduction state of bistable multivibrator 22. The output of bistable multivibrator 22, waveform K, comprises a series of square wave pulses 52 initiated by pulses 49 and terminated by pulses 51 so as to correspond in duration and timing to object shadow signal 44. The pulses 51 corresponding to the termination of the period of no signal return are ineffective to cause change in the conduction of bistable multibrator 22 because they correspond to the initial conduction state thereof.

From the foregoing it is seen that highlight detector 14, shadow detector 15, monostable multivibrators 16 and 18, "and" gate 19, differentiating circuits 21 and 23, and bistable multivibrator 22 comprise a circuit means to process received sonar signals. This means is effective to produce signal pulses corresponding in duration and time of occurrence to highlight and shadow areas in the investigative scan of the sonar beam. These signals are used in the audio alarm of the invention in a manner to be described herein.

For a practical alarm, the device should be able to distinguish between targets of varying sizes. The length of the shadow alone is not indicative of the size of the object. The lenght of the shadow cast by an object of a given height is dependent on the height off the bottom of transducer 11 and the range of the object with respect thereto. Generally, transducer 11 is housed in a towed underwater vehicle with a bottom following control contained therein and operative to maintain transducer 11 at an optimum height off the bottom for the terrain and object sought. For normal sonar operating ranges and in such an arrangement, a nearly linear relationship exists between shadow length and range for an object of fixed height with respect to the bottom.

The shadow length output signal, waveform K, from bistable multivibrator 22 is fed to controlled sawtooth generator 24. This circuit is of a conventional type, sometimes referred to as a ramp generator, and produces a pulse which increases at a linear rate and obtains a value dependent on the length of time the circuit has been activated. Waveform L, the output waveform of controlled sawtooth generator 24, is seen to comprise a series of these ramp pulses 53 corresponding to the duration and time of square wave pulses 52.

The output of monostable multivibrator 16, waveform B, is used to reset and trigger sawtooth generator 17. In response to the triggering action of square wave pulse 39, sawtooth generator 17 produces a gradually increasing voltage sawtooth pulse 54 which repeats at the ping rate of the sonar system. This sawtooth pulse 54 is used to bias Schmitt trigger circuit 25, to which it is fed, against firing. The magnitude and slope of sawtooth pulse 54 are chosen depending on the transducer 11's height off the bottom so as to produce a voltage function corresponding to the shadow length-to-range relationship discussed previously.

The output of controlled sawtooth generator 24 is fed to Schmitt trigger circuit 25. The circuit parameters of Schmitt trigger circuit 25 are chosen such that it is triggered by ramp pulse 53 when it exceeds sawtooth pulse 54 to produce an output waveform N (FIG. 3)

having a plurality of square wave pulses 55 corresponding in time of occurrence and duration to the intervals when ramp pulse 53 exceeds sawtooth pulse 54.

In this manner, sawtooth generator 17, controlled sawtooth generator 24, and Schmitt trigger 25 comprise means to analyze the shadow length in respect to its range. Some choice in design of the rate of change of ramp pulses 53 may be made in accordance with the type of object to be encountered and the operational frequency of the sonar system since these parameters have bearing on the length of shadow cast. Such design alterations of the conventional controlled sawtooth circuit 24 are normal design changes to persons versed in the electronic arts and, because they are unnecessary to describe for a complete understanding of the invention, they are not described in detail herein.

The output of Schmitt trigger 25, waveform N, is fed to differentiating circuit 27 where, as shown by waveform O, a series of spike pulses 56 are developed. Spike pulses 56 occur at the time corresponding to the leading edge of square wave pulse 55 and, hence, at the instant corresponding to the point where ramp pulse 53 exceeds sawtooth pulse 54. This is slightly after the leading edge of the reception of the object shadow signal 44 but, since the critical nature of the pulse determination has been performed, this slight delay is of no consequence in alarm actuation.

The output of differentiating circuit 27, waveform O, is used to trigger monostable multivibrator circuit 28. A square wave pulse 57, waveform P, is thereby produced by monostable multivibrator 28 for each signal which meets the criteria as determined by the previous described circuits. The recovery time of monostable multivibrator 28, which determines the duration of pulse 57, is chosen to produce an audible click and to contain a predetermined amount of electrical energy, as will become clear as the description of circuit operation continues.

The output of monostable multivibrator 28 is increased in power level by amplifier 31 to produce audible clicks in speaker 32. Thus, it is seen that differentiator circuit 27 and monostable multivibrator 28, comprise means to produce a standard electrical signal to accompany the display of a highlight followed by a predetermined length shadow signal.

Amplifier 31 together with speaker 32 comprise means to render said signals audible so as to provide accompanying sound signals with the display of said highlight followed by a predetermined length shadow signals.

A click means that a highlight followed by a shadow of sufficient length as determined by the circuitry has been received. These highlights occur randomly on the scope due to certain environmental phenomena and electrical noise phenomena which are well understood. The click signal accompanying these returns tend to condition the operator to an audio visual correlation and assure him that the set is operating normally when his full attention may be diverted or partially diverted elsewhere. If desired, in place of the clicks a keyed oscillator may be employed to generate an audio tone different from that used for the second signal, to be described. However, in practice, the click signals are preferred. What is needed to complete the alarm system is a second audio signal to alert the operator to a fixed shadow signal having a predetermined area corresponding to a stationary object. The operation of the components providing this signal will now be described.

The output of monostable multivibrator 28, waveform P, is also integrated by integrator 29 as shown in waveform Q. This signal is then applied as a control signal to the discharge network 33. Each pulse 57 from monostable multivibrator 28 causes a charging step 58 to appear in the output. The integrator 29 discharges slowly, as shown at waveform Q, but, if before it reaches its discharged state, a second square wave pulse 57 occurs and the output voltage increases until a threshold level 59 is reached. The output waveform Q changes the conduction state of discharge network 33 when it exceeds a predetermined threshold level 59.

The output of Schmitt trigger circuit 25, waveform N, is also fed to a time-to-voltage converter 26. Time-to-voltage converter 26 functions somewhat as an integrator but has no slow discharge path, as does integrator 29. Instead, the circuit's voltage output is discharged through discharge network 33 when it is in the conduction state corresponding to control threshold level 59 not having been reached and has no discharge path when discharge network is in the other state. Thus, as shown at waveform R, the first pulse 55 produces only a corresponding pulse 61 representing the first application of an object shadow signal of interest. The second applied pulse 55' causes waveform Q to exceed threshold 59, breaking the discharge path, and causing waveform R to exhibit charging step 62 and a new level. A third pulse 55" causes threshold 63 to be exceeded and, thereby, triggering Schmitt trigger 34, to which the signal is applied, to be triggered.

As indicated by the arrow associated with the symbol for Schmitt trigger 34 (FIG. 1) and the arrows associated with the broken line indicating threshold 63 (waveform R, FIG. 3), the triggering threshold 63 of Schmitt trigger 33 is adjustable. This adjustability permits an operator to set a predetermined level corresponding to a particular class of objects of interest and, thereby, avoid the alarm being activated by smaller objects on the bottom. The advantages of such a feature to a ship engaged in minehunting or salvage operations in an area having excessive bottom litter are obvious.

The output signal from Schmitt trigger 34, waveform S, is seen to have a step pulse 64 corresponding to the time threshold 63 is exceeded. This signal is then fed to differentiator 35 where, as indicated at waveform T, a trigger spike pulse 65 is developed therefrom. The trigger spike pulse 65 is fed to a monostable multivibrator 36 where a pulse 66 of suitable duration, e.g., one second, for an alarm signal is developed. This output, shown at waveform U, is used as a keying pulse for the generation of a second audible alarm signal.

As may be seen in FIG. 1, the output of monostable multivibrator 36 is applied to an audio oscillator 37 so as to key said oscillator. The audio oscillator 37 has a convenient output frequency, e.g., one kilohertz to serve as an audio tone for the second alarm signal. Audio oscillator is also keyed by the output of Schmitt trigger 34 directly. Thus, should the object shadow signal 44 be of a longer duration than pulse 66 the oscillator will continue to sound. Such a condition is illustrated in FIG. 3, waveform V, for purposes of explanation. Without this secondary keying provision audio frequency signal 67 would extend only for the duration of pulse 66. The continued application of step pulse 64 keeps the audio oscillator 37 keyed.

The output of audio oscillator 37, waveform V, is fed to amplifier 31 for driving speaker 32 therewith. The composite waveform W represents the alarm signal fed to speaker 32 corresponding to the above exemplary waveforms. Pulses 68 correspond to the audible clicks heard the first two times that object shadow signal 44 are registered while audio frequency signal 69 denotes the keying of audio oscillator 37 by the third such signal presentation.

Thus, it is seen that time-to-voltage converter 26, integrator 29, discharge network 33, differentiator 35, monostable multivibrator 36, and audio oscillator 37 together comprise secondary signal generating means. Such means is also seen to be responsive to predetermined ones of the standard electrical signals accompanying the reception of the highlight followed by a predetermined length shadow signals. The secondary signals are of such a nature as to be audibly distinct from said first signals when reproduced by the means rendering them audible.

From the aforegoing description, taken together with the appended claims, it may be seen that Applicant has described his invention such that a person versed in the electronic echo ranging arts may make and use the device. Also it will be appreciated that the device meets the operational standards outlined as objects of the invention and is a useful, unobvious advance in the art.

What is claimed is:

1. An echo ranging system having an audio-visual presentation of information comprising:
    transducer means for converting electrical energy into an energy form suitable for echo ranging techniques and for converting reflected energy into electrical signals;
    transmitter means connected to said transducer means for supplying electrical energy thereto, and for producing a series of electrical pulses having a predetermined time relationship with respect to the electrical energy supplied to said transducer means;
    receiver means, including visual display means, connected to said transducer means for receipt of electrical pulses therefrom, so as to generate a video signal and provide a range correlated visual display thereof corresponding to echo returns from and shadows cast by objects within the investigative range of said echo ranging system;
    detecting circuit means connected to said receiver means for receipt of said video signal therefrom and connected to said transmitter means for receipt of said series of electrical pulses therefrom for producing a ramp pulse shadow signal corresponding in duration and time of occurrence to the interval of shadow area signals in the investigative scan of the echo ranging system caused by shading of the bottom by objects standing proud thereof;
    analyzing circuit means connected to said detecting circuit means for comparing the length of said shadow signals with respect to the range thereof and for producing an output pulse signal when the length of said shadow signal exceeds a predetermined range-related value;
    first signal generating circuit means connected to said analyzing circuit, so as to receive said output pulse signal therefrom for generating a first predetermined electrical signal having a standard length in response thereto;
    second signal generating circuit means connected to said analyzing circuit means for receipt of said output signal therefrom and connected to said first signal generating means for receipt of said first predetermined electrical signal therefrom for generating a second predetermined electrical signal, different from said first predetermined electrical signal, in response the receipt of a predetermined number of successive first predetermined signals and in timed relationship to said output signal; and
    audio circuit means connected to said first and second signal generating circuit means for receiving said first and second predetermined signals therefrom, respectively, so as to independently produce audio signals in response to each thereof, whereby each shadow return signal is displayed visually and those having a predetermined duration with respect to their range are accompanied by a characteristic audio signal, and a second audio signal is sounded upon receipt of a predetermined number of successive signals having said predetermined duration with respect to range.

2. An echo ranging system according to claim 1 in which said detecting circuit means comprises logic circuit means as a component element thereof.

3. An echo ranging system according to claim 1 in which said audio circuit means comprises:
    amplifier means having plural input terminal connected to said first and second signal generating circuit means for receiving said first and second predetermined signals on separate ones of said plural input terminals, so as to produce a single output signal comprising both of said predetermined signals; and
    electro-acoustic transducer means connected to said amplifier means for receiving said single output signal therefrom, so as to produce therefrom audible signals.

4. An echo ranging system according to claim 1 wherein said second signal generating means comprises:
    integrating circuit means connected to said first signal generating circuit means for receipt of said predetermined electrical signal therefrom, so as to produce a signal which is the sum of said received signals;
    time-to-voltage converter circuit means connected to said analyzing circuit means for receipt of said output signal therefrom, so as to produce a voltage output signal with a series of charging steps corresponding in duration and voltage attained to the pulse length of said output pulse signal;
    discharge network circuit means connected to said time-to-voltage converter circuit means for receipt of said voltage output signal, so as to provide a path for the discharge of each of said steps thereof in one condition and connected to said integrating circuit means for receipt of said sum signal, so as to cause said discharge circuit to assume a second condition after receipt of a predetermined voltage in which said discharge path is broken and said time-to-voltage generator produces a stepped voltage output;
    an adjustable Schmitt trigger circuit means having a selectably variable triggering threshold and connected to said time-to-voltage converter circuit means for receipt of said voltage output signal therefrom, so as to produce a step pulse output when said triggering threshold has been exceeded;
    differentiating circuit means connected to said adjustable Schmitt trigger circuit means for receipt of said step pulse output therefrom, so as to produce a trigger spike pulse therefrom;

monostable multivibrator means connected to said differentiating circuit means for receipt of said trigger spike pulse therefrom, so as to produce a square wave pulse of predetermined duration in timely response thereto; and audio oscillator circuit means connected to said monostable multivibrator circuit means for receipt of said square wave pulse therefrom, and connected to said adjustable Schmitt trigger circuit means for receipt of said step pulse output therefrom, so as to produce an audio frequency output signal in response to either of received signals.

5. An echo ranging system according to claim 1 wherein said first signal generating circuit means comprises:

differentiating circuit means connected to said analyzing circuit means for receipt of said output pulse signal therefrom, so as to produce a spike pulse in timely relation therewith; and monostable multivibrator circuit means connected to said differentiating circuit means for receipt of said spike pulse therefrom, so as to produce a square wave pulse output in timely relation therewith.

6. An echo ranging system according to claim 1 in which said analyzing circuit means comprises:

a sawtooth generator circuit means connected to said detecting circuit for receipt of a triggering pulse therefrom, so as to generate a long duration sawtooth ramp pulse having a predetermined slope; and schmitt trigger means connected to said sawtooth generator circuit means for receipt of said sawtooth ramp pulse therefrom as a threshold signal therefor, and connected to said detecting circuit means for receipt of said ramp pulse shadow signal therefrom, so as to produce an output pulse when said ramp pulse shadow signal exceeds said sawtooth threshold level.

7. An echo ranging system according to claim 1 in which said detecting circuit means comprises:

first monostable multivibrator circuit means connected to said transmitter means for receiving said series of electrical pulses and generating a square wave output in timely relation thereto;

shadow detector circuit means connected to said first monostable multivibrator circuit means for receipt of said square wave therefrom, and connected to said receiver means for receipt of said video signal therefrom, so as to produce an output signal corresponding in time of occurrence and duration to periods of no signal return in said video signal and the absence of said square wave output of said first monostable multivibrator circuit means;

highlight detector circuit means connected to said receiver means for receipt of said video signal therefrom, so as to produce a pulse signal corresponding in time of occurrence to the presence of reflected energy indicating the echo return of a target;

second monostable multivibrator circuit means connected to said highlight detector circuit means for receipt of said pulse signal therefrom, so as to generate, in response thereto, a square wave having a predetermined length and a time of occurrence corresponding to said pulse signal;

logic circuit means connected to said shadow detector circuit means for receiving said output signal therefrom to constitute a first logic input signal, and connected to said second monostable multivibrator circuit means for receipt of said square wave output thereof to constitute a second logic input signal, so as to produce an output coincidence pulse signal when said logic input signals occur simultaneously;

a first differentiating circuit means connected to said logic circuit means for receiving said coincidence pulse signal therefrom, so as to develop a first trigger pulse signal in response thereto;

a second differentiating circuit means connected to said shadow detector circuit means for receipt of said output signal therefrom, so as to develop a second trigger pulse signal therefrom;

bistable multivibrator circuit means connected to said first and second differentiating circuit means for receipt of said first and second trigger pulse signals therefrom, so as to produce a shadow pulse output signal therefrom corresponding in time of ocurrence and duration to the receipt no echo signals due to shadows; and controlled sawtooth generator circuit means connected to said bistable multivibrator circuit means for receipt of said shadow pulse output signal therefrom, so as to generate a ramp pulse of predetermined slope corresponding in time of occurrence and duration to said shadow pulse output signal.

8. An echo ranging system according to claim 6 in which said analyzing circuit means comprises:

a sawtooth generator circuit means connected to said first monostable multivibrator circuit means for receipt of said square wave pulse therefrom, so as to generate a long duration sawtooth ramp pulse having a predetermined slope; and first Schmitt trigger means connected to said sawtooth generator circuit means for receipt of said sawtooth ramp pulse therefrom as a threshold signal therefor, and connected to said controlled sawtooth generator circuit means for receipt of said ramp pulse shadow signal therefrom, so as to produce an output pulse signal when said ramp pulse shadow signal exceeds said sawtooth threshold level.

9. An echo ranging system according to claim 8 wherein said first signal generating circuit means comprises:

differentiating circuit means connected to said first Schmitt trigger circuit means for receipt of said output pulse signal therefrom, so as to produce a spike pulse in timely relation therewith; and third monostable multivibrator circuit means connected to said differentiating circuit means for receipt of said spike pulse therefrom, so as to produce a square wave pulse output signal in timely relation therewith.

10. An echo ranging system according to claim 9 wherein said second signal generating means comprises:

integrating circuit means connected to said third monostable multivibrator circuit means for receipt of said square wave pulse output signal therefrom, so as to produce a signal which is the sum of said received signals;

time-to-voltage converter circuit means connected to said first Schmitt trigger circuit means for receipt of said output pulse signal therefrom, so as to produce a voltage output signal with a series of charging steps corresponding in duration and voltage attained to the pulse length of said output pulse signal;

discharge network circuit means connected to said time-to-voltage converter circuit means for receipt of said voltage output signal, so as to provide a path for the discharge each of said steps thereof in one condition and connected to said integrating circuit means for receipt of said sum signal, so as to cause said discharge circuit to assume a second condition after receipt of a predetermined voltage in which said discharge path is broken and said time-to-voltage generator produces a stepped voltage output;

an adjustable Schmitt trigger circuit means having a selectably variable triggering threshold and connected to said time-to-voltage converter circuit means for receipt of said voltage output signal therefrom, so as to produce a step pulse output when said triggering threshold has been exceeded;

differentiating circuit means connected to said adjustable Schmitt trigger circuit means for receipt of said step pulse output therefrom, so as to produce a trigger spike pulse therefrom;

monostable multivibrator means connected to said differentiating circuit means for receipt of said trigger spike pulse therefrom, so as to produce a square wave pulse of predetermined duration in timely response thereto; and audio oscillator circuit means connected to said monostable multivibrator circuit means for receipt of said square wave pulse therefrom, and connected to said adjustable Schmitt trigger circuit means for receipt of said step pulse output therefrom, so as to produce an audio frequency output signal in response to either of received signals.

11. An echo ranging system according to claim 10 in which said audio circuit means comprises:

amplifier means having plural input terminals connected to said third monostable multivibrator circuit and connected to said audio oscillator circuit means for receiving the respective output signals therefrom on separate ones of said plural input terminals, so as to produce a single amplified output signal comprising both of said input terminal signals; and electro-acoustic transducer means connected to said amplifier means for receiving said single output signal therefrom, so as to produce therefrom audible signals.

* * * * *